Figure 1:
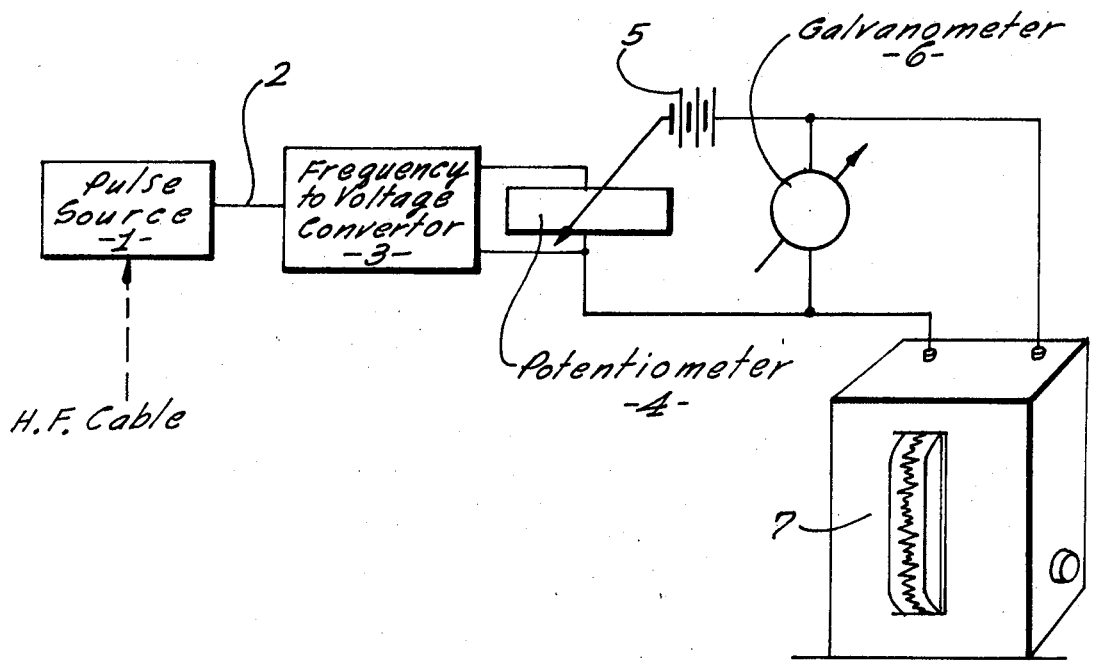

United States Patent
Klebl

[15] 3,672,230
[45] June 27, 1972

[54] METHOD AND APPARATUS FOR TESTING PRODUCTION OF HIGH FREQUENCY CABLES

[72] Inventor: Wolfram Klebl, An Der Beeke, Germany
[73] Assignee: Kabel-und Metallwerke Gutehoffnungshutte Aktiengesellschaft, Hannover, Germany
[22] Filed: Jan. 12, 1970
[21] Appl. No.: 2,056

[52] U.S. Cl. ............................................... 73/506, 324/168
[51] Int. Cl. ............................................................ G01p 3/48
[58] Field of Search ..................... 73/506, 488; 324/168, 176, 324/178; 174/102

[56] References Cited
UNITED STATES PATENTS

| | | | |
|---|---|---|---|
| 3,356,790 | 12/1967 | Polizzano et al. | 174/102 |
| 2,586,076 | 2/1952 | Nichols | 324/163 UX |
| 3,511,151 | 5/1970 | Hillman | 324/161 X |

*Primary Examiner*—Jerry W. Myracle
*Attorney*—Smyth, Roston & Pavitt

[57] ABSTRACT

The production of HF cables is supervised by indicating speed deviations from the desired cable speed. Cable speed is represented by a pulse source providing pulses leaving frequency proportionate to cable speed, the frequency is converted into a voltage to be compared with a reference for indicator control.

8 Claims, 1 Drawing Figure

INVENTOR:
Wolfram Klebl

METHOD AND APPARATUS FOR TESTING PRODUCTION OF HIGH FREQUENCY CABLES

The invention relates to a method and system for improving supervision of production and/or processing of an HF cable as passing through a production line by operation of a suitable conveyor means. Upon manufacturing HF cables it was found that defects, such as dents, depressions, bulging or buckling etc. in the conductive material may appear periodically repeatedly. Such defects pose a serious problem because it is apparent that they affect unfavorably the electrical properties of the cable. For example, faults in the conductor increase reflections therein. It is therefor necessary to carefully avoid such defects, or at least to keep them within acceptable tolerances.

Heretofore, however, there existed defects which were detected only after the cable had left the production line and was, supposedly completed. Measurements conducted thereafter, as to the electrical characteristics of the cable, permitted only rather belatedly detection of such defects as well as some quantitive analysis thereof. Such measurements, however, do not in themselves indicate the source of the error. If measured defects or faults as reflected in deviation of the desired electrical characteristics of the cable from the actual ones exceed acceptable limits and if, accordingly, the reflections in the completed cable are too high, then the entire cable is actually waste and has to be discarded as useless. Naturally, this kind of overall manufacturing procedure with subsequent defect detection in the completed cable is rather uneconomical.

We have found now that one of the sources of errors for causing such defects is the withdrawal equipment, regardless how constructed, which engages the cable in a discontinuous, jerky fashion for moving the cable through the production line. This holds true regardless of the construction of this equipment, as the jerky action stretches and upsets the conductive material. Moreover, such discontinuous and jerky engagement of the cable by the withdrawing and transporting equipment is not necessarily uniform as far as it effects the cable and wear and tear of the equipment may build up slowly.

The problem to be solved by the invention, therefore, is to find a method in which the production of defects in the cable can already be ascertained during manufacturing thereof and fast enough so that the cause and source for such defects can be pinpointed immediately and at an high degree of accuracy. This problem is solved, according to the invention, in that the speed of the cable is supervised by representing the propagation of the cable through the production line as a pulse sequence. The pulse rate represents the cable speed on an instantaneous basis. A pulse generator engages the cable directly or parts of the production line which move with the same speed as the cable.

We found in particular that, whenever pulse generation became irregular corresponding to a momentary speed deviation of the cable from the proper regular and overall uniform propagation speed, defects have been produced. The detection then of deviation of pulse spacing from regular spacing is a suitable modality to detect defects at an early stage. Moreover, it was found that the instantaneous pulse rate or frequency should be converted into a proportional voltage to provide an analog representation of the cable speed. Voltage variations in a high speed converter are sufficiently fast and responsive to cable speed variations as a result of local jerky interaction with the withdrawal equipment. The pulse generator is, therefore, connected to a pulse-frequency-to-voltage converting device having several measuring ranges and which provides voltage that is proportional to the frequency of the pulse source. A particular output voltage can be taken from a potentiometer connected to that converter. A recorder is connected to the potentiometer, together with a voltage source which provides a voltage oppositely equal and constant to the voltage provided by converter and potentiometer so that there is complete compensation, if the speed of the cable as represented by pulse frequency and output voltage of the converter, equals the constant reference voltage. Speed deviations of the cable result in similar voltages as applied to the recorder and for all measuring ranges of the converter.

The invention has the advantage that not only is there instantaneous and continuous supervision of production of the cable, but the location of such supervision can be chosen without restraint, because without difficulties the pulse source can be provided anywhere in the cable withdrawing equipment or even in engagement with the cable itself. For example, the pulse source can be located in the vicinity of interaction of the cable with the withdrawing equipment, so that local speed deviations can readily be detected.

Another advantage is to be seen in that the potentiometer can be adjusted in accordance with selection of differing operating ranges of the converter, so that the same voltage range is available for the input of the recorder, regardless of the chosen converter, and the same recording scale can be used accordingly.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates somewhat schematically equipment to be used for practicing the invention.

Proceeding now to the detailed description of the drawings, there is a pulse source 1 connected by means of a line 2, to a converter 3. Pulse source 1 may, for example, include a compensating roller and it scans along the surface of an HF cable as propagating through a production line. Alternatively, pulse source 1 may be attached to parts moving at same speed as the HF cable to be tested. For example, a shaft of the cable-withdrawal disc itself maybe constructed to serve as pulse source.

The pulse source is provided so that it furnishes a relatively large quantity of pulses in representation of cable propagation, for example, 10,000 pulses per revolution of the compensating roller, of a withdrawing disc etc. The pulse source will include a rotating part and a stationary scanner, converting the sequential presentation of indicia of the rotating part into a sequence of electrical time-spaced pulses. Converter 3 receives the pulses, and the spacing in between is a faithful replica of the propagation of the cable. Converter 3 responds particularly to the frequency of the pulses and provides a voltage which is proportional to the pulse frequency.

The output voltage of converter 3 is provided across a potentiometer 4. A source 5 of constant reference potential, is connected in series with an adjustable portion of potentiometer. The voltage that can be taken from the potentiometer 4 is subtracted from the reference voltage or vice versa and the difference is applied to a galvanometer 6 as well as to the input terminals of a recording type instrument 7, for example, a chart recorder. Galvanometer 6 and recorder 7 are connected in parallel to each other.

During operation source 1 provides pulses which in sequence and as to spacing of sequential ones represent cable propagation through the production line. These pulses are correspondingly provided with a particular instantaneous frequency which directly represents the rate of advance of the cable, and the converter 3 provides a voltage that is proportional to that speed. For example, 10,000 pulses per unit time are to be provided by source 1 when the cable has the desired speed. The output voltage of converter 3 is fed across the entire resistor portion of the potentiometer 4, but the measuring voltage to be used is taken from between one terminal and the adjustable tab or glider of the potentiometer. That voltage is compared with the reference voltage as provided by source 5 and, as stated above, the difference operates the recorder 7 as well as galvanometer 6.

It is now desirable that galvanometer as well as recorder operates within the same range for different ranges of the converter 3, and for this, potentiometer 4 is adjusted prior to beginning of measurement to a particular value obtained as follows. A calibrated reference pulse source is connected to converter 3 in lieu of cable propagation responsive source 1. The calibrated pulse source, for example is an RC generator and is presumed to provide 10,000 pulses per unit time. The converter 3 is now trimmed so that for its smallest measuring range this frequency corresponds to an output, for example, of exactly 20 volts. If the measuring ranges are changeable at a ratio 1:2:4:8, then for the same input frequency and upon switching the converter to the next higher measuring range, output voltages respectively of 10, 5 and 2.5 volts will be produced by the converter. Potentiometer 4 is now being adjusted for each and all measuring ranges so that in each case 2.5 volts can be taken from it. Voltage source 5 provides a constant reference voltage of precisely 2.5 volts and is connected in polarity opposition.

Now the auxiliary reference pulse source is disconnected from the system and pulse source 1 is connected to the input of converter 3. If, now the cable has speed that in fact 10,000 pulses are furnished by source 1 per unit time, 2.5 volts can be taken from potentiometer 4 which are fully compensated by the 2.5 volts of the source 5 of reference voltage. Accordingly, galvanometer 6 indicates 0 and recorder 7 plots along zero line. A still permissible speed error of cable withdrawal of $\pm 5$ percent, should it occur, produces for all measuring ranges of the converter 3 a voltage of $\pm 0.125$ volts as applied to instruments 6 and 7. This corresponds to a particular deflection of the galvanometer needle as well as to a particular excursion in the curve as plotted by recorder 7.

If the speed of the cable deviates from that desired speed, the proportional voltage applied to potentiometer 4 changes and the voltage taken from the potentiometer changes accordingly. Source 5 provides constant reference voltage so that galvanometer 6 now shows an deflection and a corresponding deflection will be registered on the chart plotted by device 7. The circuit in accordance with the figure of the drawing is constructed so that after it has been calibrated once, the recording device ascertains variations in the speed of the cable only; such deviations and errors are indicated, as well as recorded, as an immediate presentation of disturbing influences upon the cable advance.

The recording device should, for example, indicate limits for defining a critical range within which a cable error still remains tolerable. In other words, if was found that reflections in a cable can be tolerated up to a point, and the defects in the cable corresponding to that tolerance limit correspond to cable speed irregularities during production within a particular range. It is therefore readily ascertainable from the chart whether or not there is a tendency for the error to increase beyond these limits. Should the speed error exceed those limits cable production can be stopped immediately. The source of the speed error can readily be ascertained, for example, by correlating the curve as plotted by writer 7 with the equipment operation permitting now elimination of this potential source for the production of a defective and faulty cable.

In accordance with an additional feature of the invention the measuring device 7 may be provided with equipment, for example, with optical or acoustical transducers, responding when the speed error begins to exceed the acceptable limit, so that the operating personnel is immediately alerted and appraised of such situation. One could also provide the recording device directly with an operating contact; as soon as a maximum limit has been reached it actually turns off the manufacturing facilities automatically.

The invention is not limited to the embodiments described above but all changes and modifications thereof not constituting departures from the spirit and scope of the invention are intended to be included.

I claim:

1. The method of indirectly detecting local defects in an HF cable as it traverses and propagates through a production line comprising the steps of:
    deriving a pulse sequence from the production line, faithfully representing the propagation of the cable through the production line, the frequency of the pulses in the sequence representing cable speed;
    converting the frequency of the pulses in the sequence into a signal voltage in representation of cable speed;
    providing a compensating voltage for the voltage signal in representation of a uniform, desired cable speed; and
    providing a running visible indication of deviation of the frequency dependent; cable speed representing signal from the compensating voltage in representation of momentary speed deviations of the cable from the desired speed including particularly periodically recurring speed deviations in representation of defect causing, upsetting and stretching-recurring influences in the cable.

2. The method as in claim 1, the running indication being provided as a plotted curve on a chart, from which speed deviation and deviation tendencies are ascertainable.

3. The method as in claim 1, and including the step of providing an alerting indication when the speed deviation exceeds predetermined limits.

4. Method as in claim 1, the converting step being preceded by a step (a) of selecting a frequency-to-voltage conversion range, and by step (b) of preadjusting the converted voltage commensurate with the fixed compensating voltage as separately derived.

5. The method as in claim 1, the converting step including utilization of a multi-measuring range device and a potentiometer connected across the output of the device to obtain frequency and cable speed indicating output that is independent from the measuring range.

6. Apparatus for indirectly detecting defects in an HF cable as it traverses and propagates through a production line, comprising a production line traversed by said cable propagating therethrough;
    first means for deriving a pulse sequence from the production line faithfully representing the propagation of the cable through the production line the frequency of the pulses in the sequence representing cable speed;
    second means having plural adjustable measuring ranges and being connected to the first means for converting the frequency of the pulses in the sequence into a signal voltage in representation of cable speed, the second means having output terminals across which the signal develops;
    third means for providing a constant compensating voltage for the voltage signal in representation of a uniform, desired cable speed;
    a potentiometer with adjustable tap, connected across the terminals and having its adjustable tap connected to the third means, the tap adjusted corresponding to the selected measuring range of the second means so that the output voltage taken from the potentiometer and compared with the compensating voltage represents the desired cable speed independently from the selected measuring range; and
    fourth means connected to one of the terminals of the potentiometer and to the third means for providing a running indication of deviation of the frequency dependent signal from the compensating voltage in representation of momentary speed deviations of the cable from the desired speed in further representation of defect-causing, upsetting and stretching influences in the cable.

7. Apparatus as in claim 6, the fourth means including a recorder.

8. Apparatus as in claim 6, the fourth means including a galvanometer.

* * * * *